June 9, 1964 W. A. LINQUIST 3,136,347
DRILL BIT SHANK
Filed Oct. 15, 1962 2 Sheets-Sheet 1
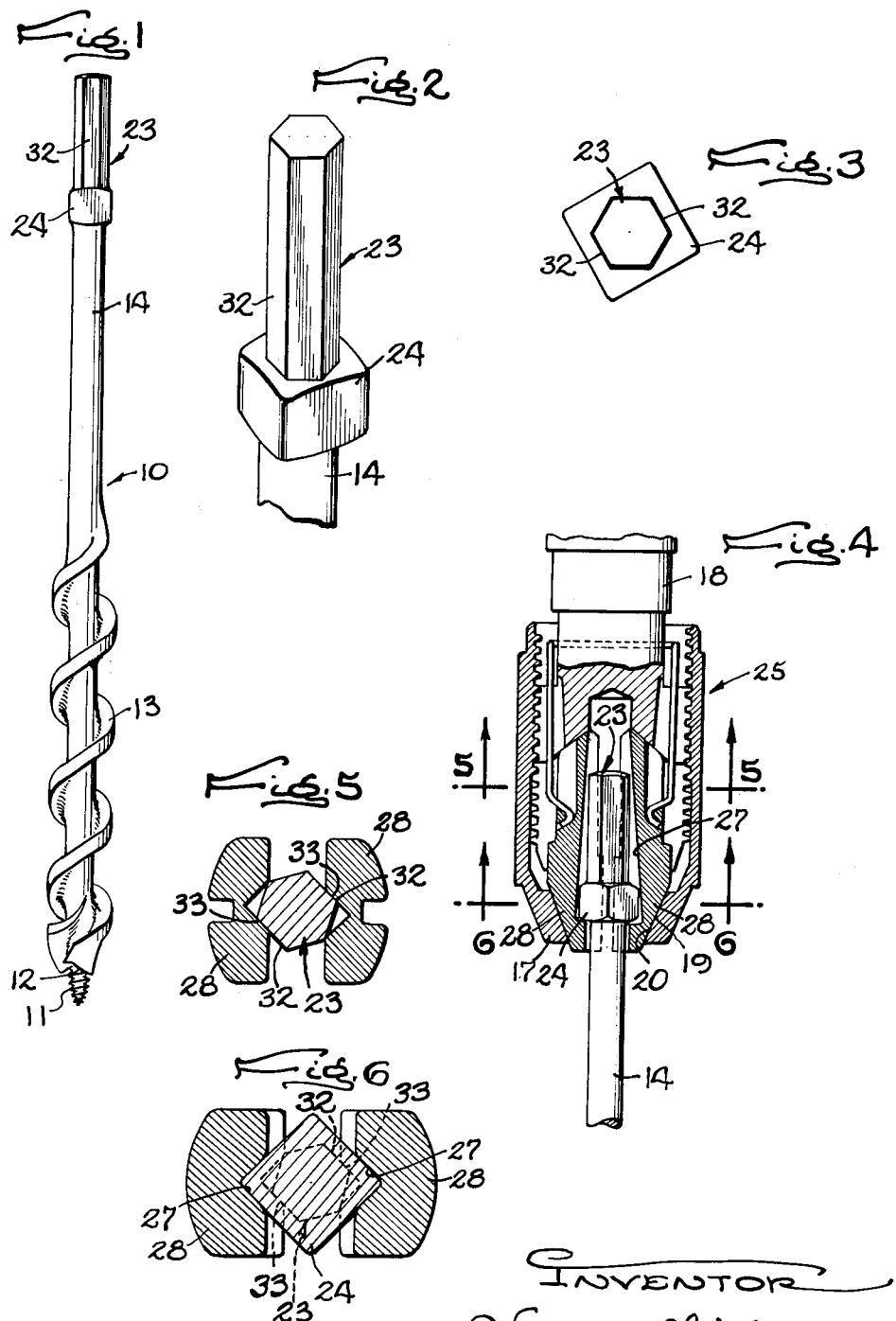
INVENTOR
Wayne A. Linquist
by Wolfe, Hubbard, Voit & Osann
ATTORNEYS June 9, 1964 W. A. LINQUIST 3,136,347
DRILL BIT SHANK
Filed Oct. 15, 1962 2 Sheets-Sheet 2
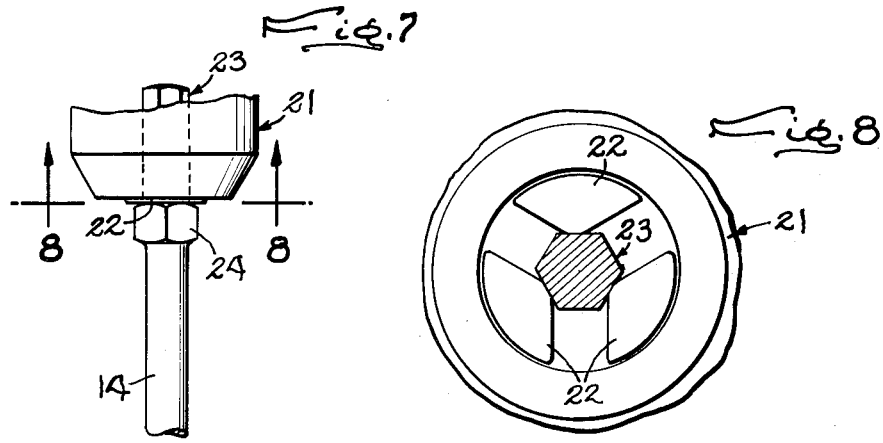
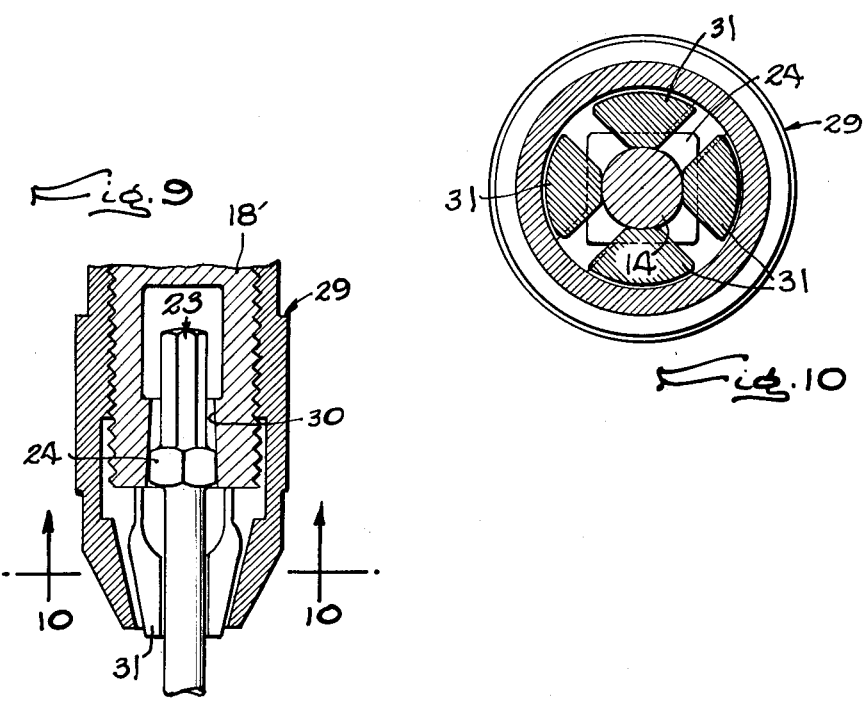
INVENTOR
Wayne A. Linquist
by Wolfe, Hubbard, Voit & Osann
ATTORNEYS 3,136,347
DRILL BIT SHANK
Wayne A. Linquist, Rockford, Ill., assignor to Greenlee Bros. & Co., Rockford, Ill., a corporation of Illinois
Filed Oct. 15, 1962, Ser. No. 230,463
3 Claims. (Cl. 145—117)

This invention relates to drill bit shanks adapted to be received in and drivingly gripped by drill chucks, and relates more particularly to combination shanks which fit chucks having different numbers of jaws.

The primary object of the invention is to provide a shank of the above character which fits all drill chucks now in commercial use and which, as compared to prior combination shanks, seats more rigidly in the more commonly used two-jaw chucks.

Another object is to provide a shank of the above character which is self-chucking in a two-jaw chuck, that is, which automatically assumes the proper seating relation with the jaws as the latter are clamped against the shank.

Other objects and advantages of the invention will become apparent from the following detailed description taken in connection with the accompanying drawings, in which FIGURE 1 is a side elevational view of a drill bit embodying the novel features of the present invention.

FIG. 2 is an enlarged fragmentary perspective view of the shank of the bit shown in FIG. 1.

FIG. 3 is a plan view of the bit shank.

FIG. 4 is a fragmentary sectional view taken in a diammetrical plane and showing the bit gripped in a two-jaw chuck.

FIG. 5 is an enlarged fragmentary sectional view taken along the line 5—5 of FIG. 4.

FIG. 6 is an enlarged fragmentary sectional view taken along the line 6—6 of FIG. 4.

FIG. 7 is a fragmentary side elevational view showing the bit gripped in a three-jaw chuck.

FIG. 8 is an enlarged fragmentary sectional view taken along the line 8—8 of FIG. 7.

FIG. 9 is a fragmentary side elevational view showing the bit gripped in a four-jaw chuck.

FIG. 10 is an enlarged fragmentary sectional view taken along the line 10—10 of FIG. 9.

As shown in the drawings for purposes of illusration, the invention is embodied in an auger-type drill bit 10 for boring holes in wood or the like. The lower end portion (see FIG. 1) of the bit is formed with a screw tip 11, cutting edges 12, and a spiral 13 for cleaning the bored hole and elevating the chips therein. Above the spiral is a shank 14 terminating in a head or tang adapted to be received in and drivingly gripped by a drill chuck.

The chucks now in commercial use employ either two, three, or four jaws which are angularly spaced around the head, the number of jaws varying with the purpose and preference of the user. The jaws are disposed in a sleeve or nosepiece 17 threaded onto the lower end of the driving member 18 and are cammed laterally into gripping engagement with the shank through the coaction of conical surfaces 19 and 20 on the lower ends of the jaws and in the sleeve.

To adapt the bit 10 for use with a chuck 21 having three jaws 22 as shown in FIGS. 7 and 8, the upper end portion 23 of the shank is of regular hexagonal cross-section coaxial with the rest of the shank and therefore is adapted to be gripped securely between the three jaws 22 with the latter clamped against three nonadjacent flat faces of the hexagon. In order that the bit also may be used in chucks having two and four jaws, a second portion 24 spaced below the hexagonal portion 23 is of somewhat enlarged, square cross-section, the opposed faces preferably being parallel. In two-jaw chucks 25 (FIGS. 4, 5 and 6) two opposed corners of the square portion 24 are gripped in upwardly tapering grooves 27 of right angle cross-section formed in the inner sides of the jaws 28 and opening toward each other. A shoulder on the lower end of each jaw projects inwardly under the square and prevents the bit from pulling axially out of the chuck.

In four-jaw chucks 29 (FIGS. 9 and 10), the driving member 18' is formed with a downwardly opening seat 30 of square cross-section which usually tapers upwardly to receive the square portion 24 with a tight fit. The jaws 31 of thse chucks clamp against the round portion of the shank with the hexagonal portion 23 merely projecting upwardly through the seat.

The present invention contemplates the provision of a novel combination shank which fits in all three types of chucks as described above and which, as compared to prior shanks of this type, seats more rigidly in the more commonly used two-jaw chucks. To this end, the hexagonal portion 23 is formed with two faces 32 (see FIGS. 3, 5 and 6) which are parallel to two opposed faces of the square portion 24. With this arrangement, the hexagonal portion also seats in and is drivingly gripped by the grooves 27 thereby to reinforce and complement the gripping and driving action of the jaws 28 on the square portion.

This action is illustrated in FIGS. 4, 5 and 6. As shown in FIGS. 4 and 6, opposed corners of the square 24 seat snugly in the lower portions of the grooves 27 with the four faces of the square clamped tightly between the four walls of the grooves and each paralleling the adjacent groove wall. Because the two faces 32 of the hexagon 23 parallel two faces of the square, these two faces 32 also seat against two opposed, parallel walls of the grooves, this parallel face-to-face contact being indicated at 33 in FIGS. 5 and 6.

In this manner, the bit shank is gripped tightly both at the square and adjacent the upper end of the hexagon with opposed parallel surfaces of the shank and the chuck jaws pressed tightly together for optimum rigidity of support. Accordingly, a substantial portion of the driving force applied to the chuck 25 is transmitted to the shank through the two faces 32 of the hexagonal portion which, therefore, contributes materially to the rigidity of support of the shank and insures proper longitudinal alinement of the shank in the chuck.

Another advantage of this arrangement is the automatic angular alinement of the shank with the grooves 27 of a two-jaw chuck resulting from the parallelism of the faces 32 with faces of the square. It makes no difference which two opposed corners of the square are seated in the grooves. With the two faces of the hexagon parallel to two faces of the square, the faces 32 always assume positions parallel to one pair of opposed groove walls as the square is seated in the grooves. Accordingly, no special care is required in inserting the bit in a two-jaw chuck.

From the foregoing, it will be seen that the combination shank seats securely in all drill chucks now in commercial use. In chucks having three or four jaws, the hexagonal and square portions 23 and 24 are used in a manner similar to that of single purpose bits having hexagonal or square shanks. In a two-jaw chuck, however, the parallel faces of the two portions of the shank coact to provide more secure gripping and positive alinement of the shank than has been possible with prior combination shanks.

I claim as my invention:
1. A drill bit shank adapted to be received and gripped in drill chucks having two, three, or four jaws, said shank including, in combination, a first portion of square cross-section and having opposed parallel faces adapted to be gripped by a four-jaw chuck, said first portion being adjacent but spaced from one end of said shank, and a second portion at said one end being of regular hexagonal cross-section and reduced cross-sectional area adapted to be gripped in a three-jaw chuck, said second portion having two parallel faces disposed in planes paralleling the planes of two opposed faces of said first portion whereby both portions of the shank may be gripped between the jaws of a two-jaw chuck to insure secure driving engagement and proper alinement of the shank with the chuck.

2. In a combination drill bit shank adapted to be received in and gripped by a drill chuck having two laterally movable jaws formed with opposed, tapering grooves of right angle cross-section, the combination of, a first portion of said shank of square cross-section and having opposed parallel faces, said first portion being adjacent but spaced from one end of the shank whereby the corners of the square seat in the deeper portions of said grooves with said faces paralleling the walls of the grooves, and a second portion at said one end being of regular hexagonal cross-section and reduced cross-sectional area, said second portion having two parallel faces disposed in planes paralleling the planes of two opposed faces of said first portion thereby to seat in the shallower portions of said grooves with said two faces parallel to and clamped between two opposed groove walls to insure secure driving engagement and proper alinement of the shank with the chuck.

3. A drill bit shank adapted to be received and gripped in drill chucks having two, three or four jaws, said shank including, in combination, a first portion of square cross-section adapted to be gripped by a four-jaw chuck, said first portion being adjacent but spaced from one end of said shank, and a second portion at said one end being of regular hexagonal cross-section and reduced cross-sectional area adapted to be gripped in a three-jaw chuck, said second portion having two parallel faces paralleling two opposed sides of said square cross-section whereby the two portions of the shank may coact with the jaws of a two-jaw chuck to insure secure driving engagement and proper alinement of the shank with the chuck.

References Cited in the file of this patent

UNITED STATES PATENTS

| | | |
|---|---|---|
| 1,209,362 | Turner | Dec. 19, 1916 |
| 2,682,184 | Szarkowski | June 29, 1954 |
| 2,766,791 | Givens | Oct. 16, 1956 |

FOREIGN PATENTS

| | | |
|---|---|---|
| 130,735 | Switzerland | Mar. 1, 1929 |